United States Patent [19]
Brink et al.

[11] Patent Number: 6,061,302
[45] Date of Patent: May 9, 2000

[54] GIMBAL LOCK SYSTEM FOR SEISMIC SENSORS

[75] Inventors: Robert H. Brink, Katy; Otis A. Johnston, Richmond, both of Tex.

[73] Assignee: Western Atlas International, Inc., Houston, Tex.

[21] Appl. No.: 09/121,135

[22] Filed: Jul. 22, 1998

[51] Int. Cl.[7] .............................. G01V 1/16; H04R 9/00
[52] U.S. Cl. ........................................... 367/188; 181/122
[58] Field of Search ................................. 367/188, 178; 181/122; 73/652

[56] References Cited

U.S. PATENT DOCUMENTS 4,525,819  7/1985  Hefer ........................................ 367/188
4,701,890 10/1987  Ohmer et al. ............................ 367/25
4,893,290  1/1990  McNeel et al. ......................... 367/178

*Primary Examiner*—Ian J. Lobo
*Attorney, Agent, or Firm*—Alan J. Atkinson

[57] ABSTRACT

An apparatus and method for selectively locking the orientation of seismic data sensor capable of detecting data regarding a seismic event. A gimbal orients the sensor into a selected vertical orientation, and a switch operates a clutch to lock the sensor from further movement. A controller can identify a time interval correlating with a seismic event, and the controller operates the switch to lock the sensor before the seismic event begins. After the completion of the seismic event, the switch unlocks the sensor so that the gimbal can permit reorientation of the sensor. The locking mechanism eliminates noise associated with moving gimbal components and is suitable for land based and marine seismic operations.

11 Claims, 1 Drawing Sheet

GIMBAL LOCK SYSTEM FOR SEISMIC SENSORS

BACKGROUND OF THE INVENTION

The present invention relates to the field of seismic exploration sensors. More particularly, the invention relates to a system for selectively locking sensor gimbals to reduce undesirable acoustic noise during seismic operations.

Seismic exploration operations use acoustic sensors to detect energy reflected from subsurface geologic formations. Acoustic energy sources generate energy for penetrating the subsurface geologic formations, and a portion of such energy is reflected upwardly from formation interfaces. Sensors for detecting the reflected acoustic energy, such a velocity detectors, are preferably aligned in a vertical orientation to eliminate signal variables caused by differing sensor orientations.

Conventional sensors use gimbal systems to align velocity detectors with the local vertical. Dual component sensors, three component land velocity sensors, four component sensors, and other seismic equipment incorporate such gimbal systems. The gimbal components may comprise a single gimbal or a primary gimbal with one or more additional gimbals. Gimbal movement during seismic data acquisition introduces noise which interferes with the detected seismic signal. Such noise is caused by contact between the internal components providing gimbal movement, and by correlative movement of the sensors.

Gimbal locks have been used to prevent transport damage to sensitive gimbal components. For example, U.S. Pat. No. 3,554,466 to Paine (1971) disclosed a gimbal lock mechanism for protecting the components during launch of the gimbal payload into orbit. U.S. Pat. No. 5,579,071 to Wetzel et al. (1996) disclosed a self-centering camera lock mechanism which avoided camera distortion as the camera was locked, and U.S. Pat. No. 3,580,363 to Plawner et al. (1971) disclosed a lock for the elevation gimbal of a large telescope. Other systems stablize gimbal movement as shown in U.S. Pat. No. 5,655,412 to Luik (1997).

Seismic data gathering operations produce numerous, consecutive seismic events triggered by the discharge of acoustic energy and the subsequent detection of the reflected signal. Sensor movement during the seismic event, such as in geophones towed behind a moving seismic vessel, inherently introduces variables into the data collection systems. In offshore seismic operations, such movement can occur due to movement of a seismic vessel, wind, waves, and ocean currents. To dampen this motion in geophone housings, viscous fluid can be placed within the interior of the gimbal structure. The viscous fluid limits movement of the geophone sensors and gimbal components by dampening such movement and by preventing extraneous movements.

Viscous damping liquids can negatively impact operation of the sensors. For example, temperature changes significantly change the fluid viscosity in a gimbal structure. A single fluid viscosity provides different damping constants when multiple gimbal masses are used. If the damping fluid is too viscous, the gimbal structure may not have sufficient righting force to respond to orientation and location changes. However, the viscosity of the fluid must be sufficiently great to retard sensor movement during the duration of a single seismic event. Otherwise, the accuracy of data detected and recorded during such seismic event will be affected by the sensor movement during each seismic event.

The stiffness of the damping fluid and the differential, righting mass of the gimbal structure define a time constant. To record a seismic signal with fidelity, the time constant should be significantly longer than the seismic record length. Accordingly, viscous damping fluids inherently require a compromise between motion fidelity between the sensor housing and sensing elements during each seismic event, and the response of the gimbal in returning to a vertical orientation after movement.

There is, accordingly, a need for an improved system for accommodating free gimbal movement of seismic exploration sensors. The system should overcome the problems of conventional fluid dampened gimbal systems and should stabilize the sensor during the pendency of each seismic event.

SUMMARY OF THE INVENTION

The present invention provides an apparatus and method for locking the orientation of a seismic data sensor capable of detecting data regarding a seismic event. The apparatus comprises a gimbal means engaged with the sensor for moving the sensor into a selected vertical orientation, a clutch for selectively locking the sensor in said selected vertical orientation and for preventing movement of said gimbal means, and a switch engaged with said clutch for activating said clutch to lock the sensor in said selected vertical orientation. In different embodiments of the invention, a controller is capable of identifying a time interval correlating with the seismic event and of operating the switch to activate the clutch for locking the sensor during such time interval. After the seismic event is complete, the controller can unlock the sensor.

The method of the invention comprises the steps of operating a gimbal means engaged with the sensor to move the sensor into a selected vertical orientation, and of operating a switch to activate a clutch for engaging the sensor to prevent movement of the sensor relative to said gimbal means and to lock the sensor into the selected vertical orientation. In different embodiments of the method, the sensor can be operated on a stationary base or in marine applications.

DESCRIPTION OF THE PREFERRED EMBODIMENTS

The invention provides a unique apparatus and method for reducing noise from movement of gimbal components during seismic data collection. The invention accomplishes this function by locking a seismic sensor during data collection intervals to prevent noise from gimbal movement from interfering with the seismic data signals. After the seismic event has been recorded, the sensor is unlocked to permit reorientation of the sensor by the gimbal structure.

Figure 1:
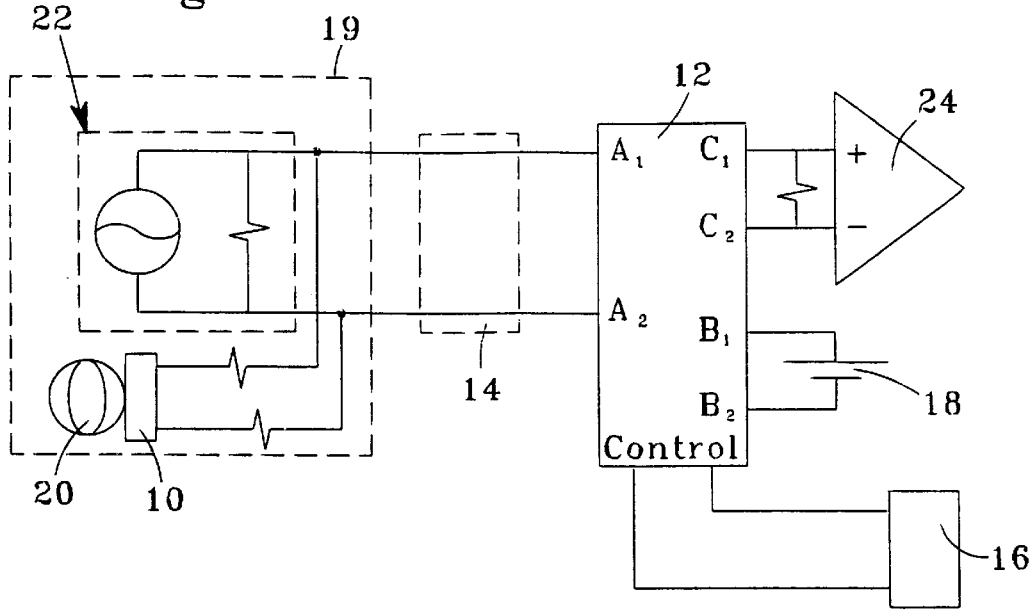
FIG. 1 illustrates a schematic for one embodiment of the invention wherein a clutch is engaged with a sensor for selectively locking the sensor during a seismic event.

FIG. 1 illustrates one embodiment of the invention in a conventional two-wire, seismic data acquisition channel. Clutch 10 is implemented by placing an analog multiplexer 12 into engagement across contacts A1 and A2 with data transmission wire-pair 14. The locking mechanism identified as clamp 10 can comprise a simple electrically controlled clutch plate or a more complex mechanism known in the art. Multiplexer 12 can comprise a low resistance, DPST reed relay or other suitable device, and can be controlled by an external signal from controller 16. Capacitor 18 is attached to multiplexer 12 across contacts B1 and B2.

Wire pair 14 is engaged with sensor housing 19 containing gimbal 20 and sensor 22. During acquisition of seismic data, clutch 10 locks gimbal 20 in a vertical orientation. Analog multiplexer 12 is switched so that output from sensor 22 is connected through wire pair 14 to seismic amplifier 24.

The voltage for disengaging clutch 10 is a simple DC voltage. More complex waveshapes could be used to impulse clutch 10 to insure that gimbal 20 is aligned with the local vertical. For example, controller 16 can generate complex waveforms which encode a signal based on amplitude, frequency, or a waveform actionable by multiplexer 12. After clutch 10 is disengaged, gimbal 20 and engaged sensor 22 can be moved to a different orientation or location, clutch 10 can be engaged again to lock gimbal 20 and sensor 22. In one embodiment of the invention, this can be accomplished by switching the voltage to analog multiplexer 12 to a level sufficiently large to disengage clutch 10. This disengagement allows gimbal 20 to move into alignment with the local vertical at the new position. After gimbal 20 has settled to a vertical orientation, the voltage is removed so that clutch 10 reengages and the sensor 22 output is switched back to the inputs C1 and C2 for seismic amplifier 24.

The embodiment shown in FIG. 1 has a potential for electrically loading sensor 22 output with the input impedance of clutch 10. Depending on the output impedance of sensor 22 and the input impedance of clutch 10 and seismic amplifier 24, this loading may be significant within the seismic band of interest.

Figure 2:
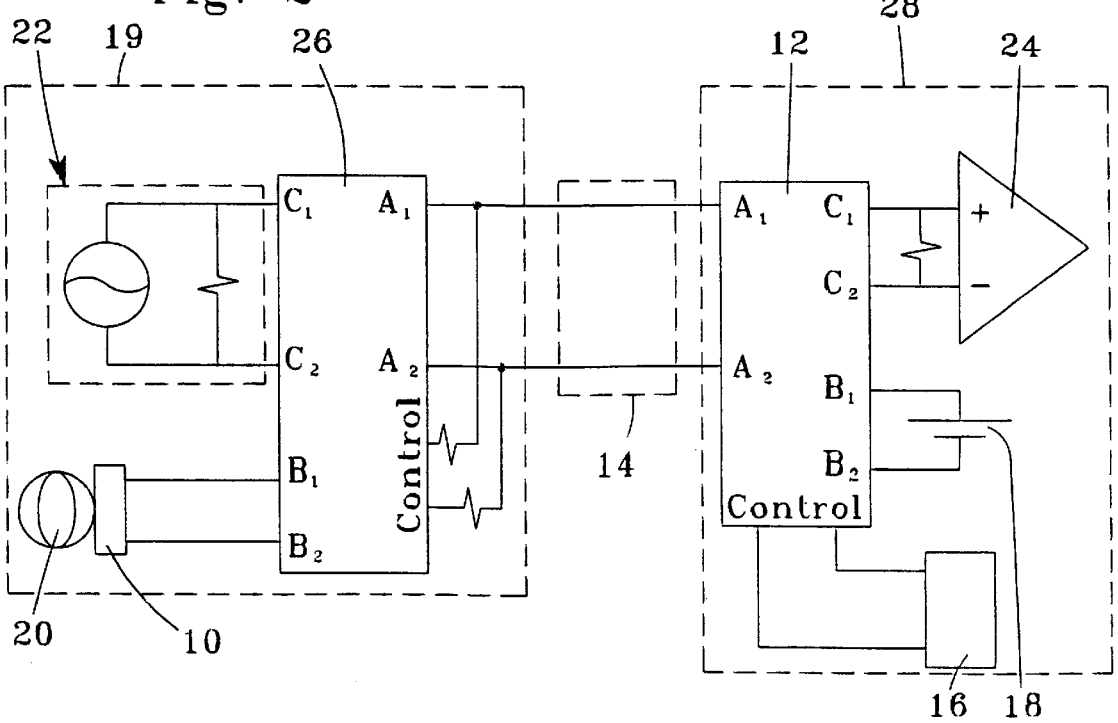
FIG. 2 illustrates a schematic for another embodiment of the invention having two cooperating multiplexers.

FIG. 2 illustrates an alternative embodiment of the invention wherein second analog multiplexer 26 is positioned near sensor 22. Sensor 22 and gimbal 20 can be positioned within sensor housing 19, and multiplexer 12 and controller 16 can be integrated within acquisition module 28. The control for second multiplexer 26 is parallel with the output of sensor 22. As with the embodiment shown in FIG. 1, a voltage larger than sensor 22 output switches second multiplexer 26 so that energy is directed to clutch 10 for locking gimbal 20.

As shown in FIGS. 1 and 2, different controlling features and combinations can be configured to accomplish the function of selectively locking and unlocking sensor carrying gimbal 10. Controllers can selectively sequence such function against the operation of seismic energy sources, and the detection of the energy reflected from subsurface geologic structures and interfaces. Because the gimbals and sensors are preferably stationary only during the time intervals when seismic data is being received by sensor 22, a control means such as controller 16 or multiplexer 12 can operate clutch 10 to lock gimbal 20 only during this time interval so that response of gimbal 20 to align sensor 22 with the local vertical is maximized to the extent possible. Although gimbal 20 can be locked during the entire data collection sequence, it is possible to unlock gimble 20 during less critical portions of the data collection intervals when the data collected is unaffected by noise from moving components. In this manner, a control means can coordinate between the different functions of vertical sensor alignment and noise reduction.

In normal operation, the gimbal structure or structures would be permitted to seek a vertical orientation relevant to local vertical. Before acquiring seismic data, the gimbal structure would be locked in place by locking gimbal 10 or the engaged sensor 12. The invention is applicable to land based sensors and to marine applications. For a land based sensor, a battery (not shown) can be incorporated within housing to power the components. Electrical power from such battery or another conventional power source can cause clutch to lock sensor 22 into the local vertical orientation, and can be programmed to respond to a broadcast signal or with a simple clock to accomplish such function after the passage of a selected time period. A clock function can be located in controller 16 or in multiplexers 24 or 26. In addition to land based operations, the invention is particularly suited for marine seismic operations wherein the orientation of each sensor is continually changing.

Although the invention has been described in terms of certain preferred embodiments, it will become apparent to those of ordinary skill in the art that modifications and improvements can be made to the inventive concepts herein without departing from the scope of the invention. The embodiments shown herein are merely illustrative of the inventive concepts and should not be interpreted as limiting the scope of the invention.

What is claimed is:

1. An apparatus for locking the orientation of a seismic data sensor capable of detecting data regarding a seismic event comprising:

a gimbal means engaged with the sensor for moving the sensor into a selected vertical orientation;

a clutch for selectively locking the sensor in said selected vertical orientation and for preventing movement of said gimbal means; and a switch engaged with said clutch for activating said clutch to lock the sensor in said selected vertical orientation, wherein said switch comprises an analog multiplexer engaged with the sensor and with said clutch.

2. An apparatus as recited in claim 1, wherein said analog multiplexer is engaged to the sensor with a transmission wire pair for transmitting electrical signals representing data of the seismic event.

3. An apparatus as recited in claim 2, further comprising an amplifier engaged with said analog multiplexer for receiving and for ampliflying the magnitude of said electrical signals.

4. An apparatus as recited in claim 2, further comprising a second analog multiplexer engaged with the sensor and with said analog multiplexer for selectively controlling operation of said clutch.

5. An apparatus as recited in claim 1, wherein said switch is capable of activating said clutch at a selected time.

6. A method for locking the orientation of a seismic data sensor capable of detecting data regarding a seismic event, comprising the steps of:

moving the sensor along a selected survey route;

operating a gimbal means engaged with the sensor to move the sensor into a selected vertical orientation as the sensor is moved along the survey route;

determining the time for initiation of the seismic event; and operating a switch to activate a clutch for engaging the sensor to prevent movement of the sensor relative to said gimbal means and to lock the sensor into the selected vertical orientation before initiation of the seismic event.

7. A method as recited in claim 6, further comprising the step of operating said switch to deactivate said clutch for unlocking the sensor after the sensor detects data regarding the seismic event.

8. A method as recited in claim 6, further comprising the steps of operating a controller connected with said switch to identify a time interval correlating with the seismic event to activate said clutch.

9. A method as recited in claim 8, further comprising the step of operating said controller to operate said switch and said clutch to unlock the sensor after completion of said time interval.

10. A method as recited in claim 6, further comprising the step of positioning said gimbal means and said switch on a stationary base before said switch is operated.

11. A method as recited in claim 6, further comprising the step of moving said gimbal means and said switch through water before said switch is operated.

* * * * *